US012714097B2

(12) United States Patent
Pancheri et al.

(10) Patent No.: US 12,714,097 B2
(45) Date of Patent: Aug. 25, 2026

(54) COMPOSITIONS AND SYSTEMS FOR DISINFECTION

(71) Applicant: Markesbery Blue Pearl LLC, Hebron, KY (US)

(72) Inventors: Eugene J. Pancheri, Cincinnati, OH (US); Daniel H. Lajiness, Fairfield, OH (US); W. Russell Markesbery, Hebron, KY (US)

(73) Assignee: MARKESBERY BLUE PEARL LLC, Hebron, KY (US)

( * ) Notice: Subject to any disclaimer, the term of this patent is extended or adjusted under 35 U.S.C. 154(b) by 927 days.

(21) Appl. No.: 17/909,043

(22) PCT Filed: Mar. 5, 2021

(86) PCT No.: PCT/US2021/021045

§ 371 (c)(1),
(2) Date: Sep. 2, 2022

(87) PCT Pub. No.: WO2021/178774

PCT Pub. Date: Sep. 10, 2021

(65) Prior Publication Data

US 2023/0108403 A1 Apr. 6, 2023

Related U.S. Application Data

(63) Continuation-in-part of application No. 16/755,361, filed as application No. PCT/US2018/055367 on Oct. 11, 2018, now abandoned.

(60) Provisional application No. 62/985,783, filed on Mar. 5, 2020, provisional application No. 62/570,808, filed on Oct. 11, 2017, provisional application No. 62/591,591, filed on Nov. 28, 2017, provisional application No. 62/591,588, filed on Nov. 28, 2017.

(51) Int. Cl.

| | |
|---|---|
| ***A01N 25/02*** | (2006.01) |
| ***A01N 31/02*** | (2006.01) |
| ***A01N 59/00*** | (2006.01) |
| ***A01N 65/08*** | (2009.01) |

(52) U.S. Cl.
CPC ............. *A01N 25/02* (2013.01); *A01N 31/02* (2013.01); *A01N 59/00* (2013.01); *A01N 65/08* (2013.01)

(58) Field of Classification Search
CPC ........ A01N 25/02; A01N 31/02; A01N 59/00; A01N 65/08; A01N 31/04; A01N 31/08; A01N 31/16; A01N 35/02; A01N 37/02; A01N 37/16; A01N 65/28; A61L 2/186; A61L 2/18; Y02A 50/30
See application file for complete search history.

(56) References Cited

U.S. PATENT DOCUMENTS

| | | | |
|---|---|---|---|
| 5,772,971 | A | 6/1998 | Murphy et al. |
| 6,436,342 | B1 | 8/2002 | Petri et al. |
| 6,916,493 | B2 | 7/2005 | Morelli et al. |
| 7,351,684 | B2 | 4/2008 | Tichy et al. |
| 7,473,675 | B2 | 1/2009 | Tichy et al. |
| 7,534,756 | B2 | 5/2009 | Tichy et al. |
| 7,658,953 | B2 | 2/2010 | Bobbert |
| 8,034,759 | B2 | 10/2011 | Man et al. |
| 8,110,538 | B2 | 2/2012 | Martin et al. |
| 8,569,221 | B2 | 10/2013 | Cunningham et al. |
| 8,598,106 | B2 | 12/2013 | Schwarz et al. |
| 8,716,339 | B2 | 5/2014 | Arson et al. |
| 8,772,218 | B2 | 7/2014 | Cunningham et al. |
| 8,789,716 | B2 | 7/2014 | Larson et al. |
| 8,883,074 | B2 | 11/2014 | Bobbert |
| 8,987,331 | B2 | 3/2015 | Larson et al. |
| 9,044,403 | B2 | 6/2015 | Shultz |
| 9,192,909 | B2 | 11/2015 | Kraus et al. |
| 9,241,483 | B2 | 1/2016 | Golden et al. |
| 9,861,102 | B2 | 1/2018 | Markesbery et al. |
| 9,936,695 | B1 | 4/2018 | Bingham et al. |

(Continued)

FOREIGN PATENT DOCUMENTS

| | | |
|---|---|---|
| CN | 104434669 | 3/2015 |
| EP | 2724614 A1 | 4/2014 |

(Continued)

OTHER PUBLICATIONS

Office Action dated Oct. 7, 2024, in related Canadian Application No. 3,025,115 filed Nov. 23, 2018 (4 pages).
Office Action dated Oct. 29, 2024, in related Japan Application No. 1809805 filed Sep. 5, 2022 (4 pages), with English translation (4 pages).
Extended European Search Report dated Nov. 14, 2024 for corresponding EP Application No. 21 763 705.7 filed Oct. 4, 2022 (9 pages).
Hey, M.J., Surface tensions of mixed aqueous solutions of tert-butanol and n-pentanol, Colloids and Surfaces A: Physicochem. Eng. Aspects, 262 (Jul. 2005) 198-203 (6 pages).

(Continued)

*Primary Examiner* — Sue X Liu
*Assistant Examiner* — Nathan W Schlientz
(74) *Attorney, Agent, or Firm* — Daniel F. Nesbitt; Daniel H. Lajiness; Nesbitt IP LLC

(57) ABSTRACT

A disinfectant system, comprising a first aqueous composition having a peracid reactant compound that is either a peroxide compound or an organic acid compound, and a second aqueous composition comprising the peracid reactant compound not selected for the first composition. Each composition is applied separately to, and combined upon, a surface to form a reaction layer, within which a peracid is formed in situ, disinfecting the surface. The compositions can have a flash point, surface tension, and vapor pressure compatible for application as a spray, mist, aerosol, or fog, and can be formulated with an alcohol blend that enables the reaction layer to completely evaporate from the surface after disinfection is complete. In use, the disinfectant systems disclosed herein have up to 99.999% antimicrobial efficacy against organism such as *Staphylococcus aureus, Pseudomonasaeruginosa*, and *Candida auris*.

20 Claims, 2 Drawing Sheets

(56) References Cited

U.S. PATENT DOCUMENTS

| | | | |
|---|---|---|---|
| 10,603,396 | B2 | 3/2020 | Markesbery et al. |
| 2005/0139608 | A1 | 6/2005 | Muehlhausen et al. |
| 2005/0238631 | A1 | 10/2005 | Burwell |
| 2006/0289354 | A1 | 12/2006 | Zhou et al. |
| 2007/0231200 | A1 | 10/2007 | Lin et al. |
| 2008/0000931 | A1 | 1/2008 | Tichy et al. |
| 2008/0241269 | A1 | 10/2008 | Velasquez |
| 2010/0316530 | A1 | 12/2010 | Morgantini et al. |
| 2012/0241537 | A1 | 9/2012 | Schwei et al. |
| 2013/0316055 | A1 | 11/2013 | Holt |
| 2014/0178249 | A1 | 6/2014 | Tichy et al. |
| 2014/0238445 | A1 | 8/2014 | Stokes et al. |
| 2014/0378544 | A1 | 12/2014 | Kraus et al. |
| 2015/0102061 | A1 | 4/2015 | Arson et al. |
| 2015/0297770 | A1 | 10/2015 | Larson et al. |
| 2016/0022850 | A1 | 1/2016 | Tsai et al. |
| 2020/0306399 | A1 | 10/2020 | Markesbery et al. |
| 2021/0015954 | A1 | 1/2021 | Markesbery et al. |

FOREIGN PATENT DOCUMENTS

| | | | |
|---|---|---|---|
| GB | 2257630 | A | 1/1993 |
| WO | 2008021441 | A2 | 2/2008 |
| WO | 2011044916 | A1 | 4/2011 |
| WO | 2015074144 | | 5/2015 |
| WO | 2018223080 | A1 | 12/2018 |
| WO | 2019075176 | A2 | 4/2019 |

OTHER PUBLICATIONS

Torabian, E., New models for predicting the flash point of mixtures containing different alcohols, Process Safety and Environment Protection, vol. III (Jul. 2017) 439-448 (10 pages).

2nd Office Acition dated Jan. 24, 2025, in related China Application No. 202180031445.4 filed Oct. 27, 2022 (5 pages), with Google machine translation (6 pages).

Yalkwosky, S.H., et al., (2010) Handbook of Aqueous Solubility Data, Second Edition, CRC Press, Boca Raton, FL, (1622 pages).

Hodges, G., et al., A comparison of log Kow (n-octanol-water partition coefficient) values for non-ionic, anionic, cationic and amphoteric surfactants determined using predictions and experimental methods, (2019) Environ. Sci. Eur. 31:1-18 (18 pages).

Alcohol, Encyclopaedia Britannica Inc, www.britannica.com/print/article/13366, Dec. 13, 2019 (9 pages).

Biscay, F., et al., Surface tension of water-alcohol mixtures from Monte Carlo simulations, The Journal of Chemical Physics 134, 044709 (2011) (10 pages).

Purtabs, Effervescent Sanitizing / Disinfection Tablets, Earthsafe Chemical Alternatives, LLC, 2018, (11 pages).

Sankar, M., et al., The benzaldehyde oxidation pradox explained by the interception of peroxy radical by benzyl alcohol, Nature Communications, Feb. 25, 2014, (6 pages).

Vazquez, G., et al., Surface Tension of Alcohol + Water from 20 to 50 ° C, J. Chem. Eng. Data 1995, 40, p. 611 (1 bage).

OxyCide Daily Disinfectant Cleaner, ECOLAB, 4 pages.

Hillsboro, Jess, "Sanitizing with Vinegar and Hydrogen Peroxide", The Urban Homestead by Kelly Coyne and Erik Knutzen, Mar. 29, 2012 (5 pages).

Ist K: EPA's Registered Antimicrobial Products Effective against Clostridium difficile Spores, Jan. 2018, (2 pages).

Rutala, William, et al., "Guideline for Disinfection and Sterilization in Healthcare Facilities, 2008", Center for Disease Control, Dept. of Health and Human Services, USA, pp. 7-30 and 50-51, 2008, (158 pages).

Bhal, S.K., Application Note, LogP-Making Sense of The Value, Advanced Chemistry Development, Inc., www.acdlabs.com, May 29, 2019 (4 pages).

Sumner, "Peroxide and Vinegar Sterilization", Apr. 11, 2011, Cook's Info, http://web.archive.org/ web/20160713134637/http://www.cooksinfo.com/peroxide-vinegar-sterilization (3 pages).

Kinoshita, K., et al., Solubility of Alcohols in Water Determined by the Surface Tension Measurements, Short Communications, vol. 31, No. 9, Dec. 1958, pp. 1081-1082 (2 pages).

International Search Report and Written Opinion dated Aug. 16, 2021 in related International Application No. PCT/US2021/021045 filed Mar. 5, 2021 (12 pages).

Bell, Kristen Y., "Reduction of foodborne micro-organisms on beef carcass tissue using acetic acid, sodium bicarbonate, and hydrogen peroxide spray washes", Oct. 1, 1997, Food Microbiology, vol. 14, No. 5, pp. 439-448 (10 pages).

COMPOSITIONS AND SYSTEMS FOR DISINFECTION

CROSS-REFERENCE TO RELATED APPLICATIONS

This application is a § 371 national stage entry application claiming priority to PCT Application No. PCT/US2021/021045, filed on Mar. 5, 2021, which claimed the benefit of U.S. Provisional Application No. 62/985,783, filed on Mar. 5, 2020, the disclosures of which are incorporated herein by reference in their entireties. This application is also a continuation-in-part of U.S. Non-Provisional Application No. 16,755,361, filed on Apr. 1, 2020, which was a § 371 national stage entry application claiming priority to PCT Application No. PCT/US2018/055367, filed on Oct. 11, 2018 (and published on Apr. 18, 2019, as WO2019/075176, below), which itself claimed priority to U.S. Provisional Application No. 62/570,808, filed on Oct. 11, 2017, U.S. Provisional Application No. 62/591,591, filed on Nov. 28, 2017, and U.S. Provisional Application No. 62/591,588, filed on Nov. 28, 2017.

FIELD OF THE INVENTION

This invention is related to the field of disinfection and sterilization compositions and systems.

BACKGROUND OF THE INVENTION

There is a need for an inexpensive, effective, yet safe and convenient method to minimize the microbial burden of objects we interact with, without leaving behind microbes with resistance to future treatment. This need is demonstrated by the coronavirus (also known as SARS-CoV-2 or COVID-19) pandemic. Consequently, disinfectant systems for killing viruses, bacteria, and fungi are needed that prevent them from developing resistance, while using ingredient compounds that are not hazardous to humans, pets and other beneficial life that may be exposed to them.

Combinations of hydrogen peroxide and acetic acid to form peroxyacetic acid have proven to be especially effective. Several methods, apparatuses, and disinfecting systems utilizing peracids, including peroxyacetic acid, are well known in the art.

However, one of the biggest drawbacks with using peracids is that they are easily hydrolyzed, and consequently have limited storage stability and shelf life. Peroxyacetic acid instability is described in detail in U.S. Pat. No. 8,034,759. Measures to stabilize peracids in solution, as described, for example, in U.S. Pat. Nos. 8,110,538 and 8,716,339, can be unsafe and require additional components that are expensive, relatively scarce, and have undesirable environmental effects.

As a result, there is still a need for sterilization and disinfecting methods utilizing peracids that are simultaneously effective, convenient, and safe, while at the same time using cheap and readily available materials.

SUMMARY OF THE INVENTION

The present invention provides systems of compositions for disinfecting surfaces using peracids, the system comprising a first aqueous composition comprising a first peracid reactant compound that is either a peroxide compound or an organic acid compound, and a second aqueous composition comprising a second peracid reactant compound that is the other of the first peracid reactant compound. The compositions are formulated such that when they are applied separately to, and combined upon, a surface in need of disinfecting, a peracid composition is formed in situ, thereby disinfecting the surface.

In some embodiments, the first aqueous composition and the second aqueous composition each comprise one or more alcohols comprising at least 0.05% by weight, and up to 70% by weight of the aqueous composition. In some embodiments, each aqueous composition comprises a first alcohol selected from the group of lower-chain alcohols consisting of ethanol, isopropanol, t-butanol, and combinations thereof.

In some embodiments, the concentration and identity of alcohol compounds within an aqueous composition are selected to reduce the surface tension of a composition and enhance its spread upon a surface to be disinfected. In some embodiments, the surface tension of each of the aqueous compositions is less than 50 dyne/cm at 20° C. In some embodiments, the surface tension of at least one of the aqueous compositions, preferably the aqueous composition applied first to the surface, is less than 30 dyne/cm at 20° C.

In a related aspect, there are described herein aqueous compositions that are formulated to maintain a low surface tension, while possessing a flash point elevated enough to be safely energetically distributed as aerosols into rooms and other volumetric spaces. In some embodiments, the flash point of each of the aqueous compositions within a disinfectant system is at least 50° C.

In some embodiments, aqueous compositions that are formulated to have a surface tension less than 30 dyne/cm at 20° C. while also having a flash point greater than 50° C. can comprise an alcohol blend comprising the first alcohol, a second alcohol, and optionally, one or more additional alcohols. In some embodiments, the second alcohol is selected based on its ability to form a partition at the air/water interface of an aerosol droplet, while simultaneously being soluble enough to avoid forming a lens on the droplet surface. In some embodiments, the second alcohol, in its neat, unmixed form, can have a partition coefficient (Log P) of at least 1.20 and a water solubility in range of at least 10 g/L, and up to 30 g/L, when measured at 25° C. In some embodiments, the second alcohol can also be selected to have a flash point greater than 40° C., in the event a lens is formed on a droplet surface. In some embodiments, a mid-chain $C_5$-$C_8$ aliphatic, alicyclic, or aromatic alcohol compound can be selected as the second alcohol in an alcohol blend. In some embodiments, the second alcohol is selected from the group consisting of n-pentanol; 2-methyl-1-butanol; 3,3-dimethyl-2-butanol; 4-methyl-2-pentanol; 2-methyl-3-pentanol; 3-methyl-2-pentanol; 2-hexanol; 3-hexanol; phenol; 4-methyl phenol; phenylethyl alcohol; and 1-phenylethanol.

In a related aspect, the concentration and mass ratio of the second alcohol can be modulated to arrive at a desired composition surface tension and flash point. In some embodiments, aqueous compositions comprising an alcohol blend and a $C_5$-$C_8$ aliphatic, alicyclic, or aromatic alcohol compound as the second alcohol can be formulated so that: the aqueous composition has a flash point of at least 50° C.; the mass ratio of the first alcohol relative to the second alcohol within the aqueous composition is at least 1:10, and up to 4:1; the second alcohol comprises up to 2.5% by weight of the aqueous composition; the alcohol blend comprises at least 2.0% by weight, and up to 4.5% by weight, of the aqueous composition; and the surface tension of the aqueous composition comprising the alcohol blend is less than 30 dyne/cm at 20° C. In some embodiments, the first aqueous composition and the second aqueous composition each comprise at least 0.05% by weight, and up to 5% by weight, of alcohol.

In a related aspect, any of the aqueous compositions described herein can be formulated to readily evaporate after the peracid is formed in situ and the surface is disinfected. In some embodiments, at least 99.5%, and preferably at least 99.9%, by weight of each composition is comprised of components having a vapor pressure of at least 1.0 mm Hg at 20° C.

In a related aspect, when present in any of the aqueous compositions described herein, the peroxide compound can be hydrogen peroxide, and can comprise up to 25% by weight of the aqueous composition.

In a related aspect, when present in any of the aqueous compositions described herein, the organic acid compound can be acetic acid, and can comprise up to 50% by weight of the aqueous composition. In some embodiments, the aqueous composition comprising acetic acid can have a pH less than 7.0.

Also described herein are disinfectant systems in which each aqueous composition has: a flash point of at least 50° C.; at least 0.05% by weight, and up to 5% by weight, of alcohol; at least 99.5% by weight of components having a vapor pressure of at least 1.0 mm Hg at 20° C.; and a surface tension less than 50 dyne/cm at 20° C. In some embodiments, the disinfectant system comprises a first aqueous composition that comprises: at least 0.5% by weight, and up to 10% by weight, of acetic acid; at least 1.0% by weight, and up to 3.5% by weight, of ethanol; and at least 0.5% by weight, and up to 1.5% by weight, of at least one alcohol compound selected from the group consisting of 2-hexanol and 3-hexanol, and a second aqueous composition that comprises: at least 0.5% by weight, and up to 10% by weight, of hydrogen peroxide; and up to 4.5% by weight of isopropanol. In some embodiments, the disinfectant system comprises a first aqueous composition that comprises: at least 0.5% by weight, and up to 10% by weight, of acetic acid; at least 1.0% by weight, and up to 3.5% by weight, of ethanol; and at least 0.5% by weight, and up to 2.0% by weight, of n-pentanol, and a second aqueous composition that comprises: at least 0.5% by weight, and up to 10% by weight, of hydrogen peroxide; and up to 4.5% by weight of isopropanol. In either of the above aqueous compositions, the first aqueous composition can further comprise a third alcohol, isopropanol, at a concentration of at least 0.1% by weight, and up to 0.5% by weight, and a fourth alcohol, n-butanol, at a concentration of at least 0.1% by weight, and up to 0.5% by weight.

In a related aspect, any of the aqueous compositions within any of the disinfectant systems described herein can further comprise a natural biocidal blend, the natural biocidal blend comprising at least 0.001% by weight, and up to 0.5% by weight, of the composition, wherein the natural biocidal blend comprises one or more natural biocides or natural biocidal compounds selected from the group consisting of manuka honey, oregano oil, thyme oil, lemongrass oil, lemon oil, orange oil, anise oil, clove oil, aniseed oil, cinnamon oil, geranium oil, rose oil, mint oil, peppermint oil, lavender oil, citronella oil, eucalyptus oil, sandalwood oil, cedar oil, rosmarin oil, pine oil, vervain fleagrass oil, ratanhiae oil, methylglyoxal, carvacrol, eugenol, linalool, thymol, p-cymene, myrcene, borneol, camphor, caryophillin, cinnamaldehyde, geraniol, nerol, citronellol, and menthol, including combinations thereof.

In a related aspect, any of the aqueous compositions within any of the disinfectant systems described herein can be formulated to be substantially free, and preferably completely free, of surfactants, bleaches, polymers, chelators, metal colloids, and nanoparticles.

In a related aspect, any of the disinfectant systems described herein can be formulated to generate a peracid composition on a surface in situ, in which the peracid composition exhibits antimicrobial efficacy against at least one microorganism selected from the group consisting of: *Staphylococcus aureus* (ATCC #6538), *Pseudomonas aeruginosa* (ATCC #15442), and *Candida auris* (CDC #AR-0381). In some embodiments, the antimicrobial efficacy of the in situ peracid composition against *Staphylococcus aureus* and *Pseudomonas aeruginosa* can be measured in accordance with the protocols of the AOAC Germicidal Spray Method 961.02. In some embodiments, the antimicrobial efficacy of the in situ peracid composition against *Candida auris* can be measured in accordance with the protocols of the OECD Quantitative Method for Evaluating Efficacy of Liquid Antimicrobials.

In a related aspect, any of the disinfectant systems described herein can be packaged and/or configured to prevent contact between the first aqueous composition and the second aqueous composition until both aqueous compositions have been dispersed into the volumetric space. In some embodiments, any of the disinfectant systems described herein can be packaged and/or configured to prevent contact between the first aqueous composition and the second aqueous composition until both aqueous compositions have contacted the surface to be disinfected.

These and other embodiments of the present invention will be apparent to one of ordinary skill in the art from the following detailed description.

DETAILED DESCRIPTION OF THE INVENTION

Figure 1:
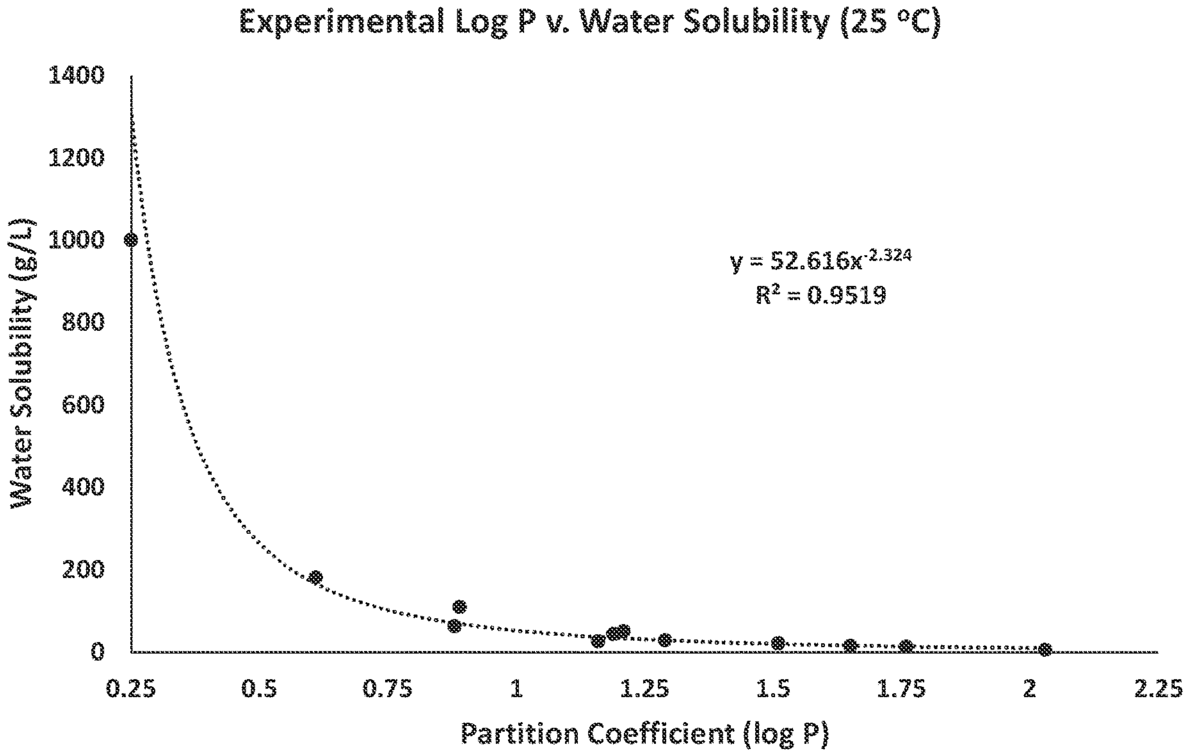
FIG. 1 shows a standard curve of the water solubility of common alcohol compounds as a function of their Log P.

The present disclosure includes disinfectant systems comprising multiple aqueous compositions formulated to generate peracids on target surfaces in situ. Other present methods and systems require a peracid to be formed prior to application onto a surface. As a result, conventional peracid-based disinfecting systems require additional reactants or stabilizers to be present. In contrast, the compositions utilized in the systems of the present invention do not require stabilizers because compounds that form the peracid are dispersed separately, and they are combined only upon the surface(s) to be disinfected.

Definitions

As used in this specification and in the claims, the singular forms “a,” “an,” and “the” include plural referents unless the content clearly dictates otherwise.

The terms, “free” or “substantially free” refers to the total absence or near total absence of a particular compound in a composition, mixture, or ingredient.

As used herein, the term “neat,” with respect to an alcohol compound, refers to the pure, undiluted, and/or unmixed compound in a liquid phase and in the absence of a solvent. As described in further detail below, multiple physical properties of alcohol compounds in their neat form, particularly mid-chain $C_5$-$C_8$ alcohol compounds, can be evaluated to identify candidates for inclusion in the alcohol blend of one or more of the aqueous disinfectant precursor compositions of the present invention.

As used herein, the phrase, "peracid reactant compound" refers to a reactant compound that will react to form a peracid on the target surface in situ.

As used herein, the term, "reaction layer," refers to a layer formed on a surface to be disinfected when an aqueous composition comprising a second peracid reactant compound is applied onto a coalesced layer of an aqueous composition comprising first a first peracid reactant compound that is already on the surface. The product of the two reactant compounds is formed in situ on the reaction layer.

In describing embodiments of the disinfectant systems of the present disclosure, reference will be made to "first" or "second" as they refer to aqueous compositions or peracid reactant compounds. Except when there is clear context that a specific order is intended, "first" and "second" are merely relative terms, and a "first" composition or reactant compound described could just as easily and conveniently be referred to as a "second" composition or reactant compound, and such description is implicitly included herein.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 0.5% to about 10% by weight includes not only the explicitly recited limits of 0.5% by weight and 10% by weight, but also individual weights such as 1% by weight and 5% by weight, and sub-ranges such as 2% to 8% by weight, 5% to 7% by weight, etc.

Embodiments of the Invention

Without being limited by theory, it is believed that peracids are so effective as disinfectants because they are powerful oxidizing agents that can irreversibly damage proteins and DNA within microorganisms. Peracids are formed in an acid-catalyzed reaction when a strong oxidizing agent, such as a peroxide compound, comes into contact with an organic acid. For example, in a system that utilizes acetic acid as the organic acid, addition of a peroxide compound such as hydrogen peroxide can result in a reaction in which peracetic acid and water are produced in equilibrium as shown below:

$$H_2O_2 + CH_3COOH \leftrightarrow CH_3COO{-}OH + H_2O$$

Once the peracid is formed on the surface to be disinfected, it is strongly electrophilic. If there are no electron-rich sources in solution with the peracid, the excess water will drive equilibrium toward hydrolysis of the peracid and back into production of the parent acid. Additionally, as the parent acid becomes increasingly acidic, the resultant peracid similarly becomes more reactive. Thus, even though the resultant peracid could become an even better disinfectant under those conditions, it is also more unstable and may potentially never reach the target surface, regardless of how immediately before application the individual components are mixed. Consequently, embodiments of this invention can similarly be more effective than the present art in industrial applications where stronger and more strictly-controlled components are used and cost is not an object.

Generally, the disinfectant systems of the present invention utilize at least two aqueous compositions—a first aqueous composition comprising a first peracid reactant compound that is either a peroxide compound or an organic acid compound, and a second aqueous composition comprising a second peracid reactant compound that is the other of the first peracid reactant compound. The compositions can either be separately dispersed into a volumetric space and deposited onto the surface(s) to be disinfected, or they can be separately dispersed onto the surface(s) directly. In some embodiments, the separately dispersed aqueous compositions can make contact with each other in the air within the volumetric space, forming a peracid that deposits onto the surfaces, thereby disinfecting them. In other embodiments, the two aqueous compositions are sequentially dispersed, such that upon the deposit of the first aqueous composition onto the surface to form a coalesced first aqueous composition layer, the second aqueous composition is subsequently dispersed and deposits onto the coalesced first aqueous composition layer, forming a reaction layer upon the surface, within which a peracid is formed in situ, disinfecting the surface. In another embodiment, the second aqueous composition can deposit into a coalesced second aqueous composition layer, which can be combined with the coalesced first aqueous composition layer to form the reaction layer.

In embodiments in which the peracid is only formed within a reaction layer formed upon the surface, the effectiveness of such disinfectant systems is expected to be independent of the order in which the aqueous compositions are dispersed. Thus, the first peracid reactant compound can either be an organic acid compound or a peroxide compound, so long as the second peracid reactant compound is the opposite compound of that chosen to be the first peracid reactant compound. For example, the second peracid reactant compound is an organic acid compound if a peroxide compound is selected to be the first peracid reactant compound, and the second peracid reactant compound is a peroxide compound if an organic acid compound is selected to be the first peracid reactant compound. Although the compositions containing the peracid reactant compounds are generally mostly aqueous, water need not comprise the majority of the composition. Furthermore, any liquid carrier system that can facilitate the formation of the peracid from a peroxide compound and an organic acid can be used.

In another embodiment, an aqueous composition containing a peroxide compound, non-limiting examples of which are hydrogen peroxide, metal peroxides, and ozone, can comprise at least 0.1%, or 0.5%, or 1%, or 2%, or 4%, or 6%, or 8%, or 10%, or 12%, or 14%, or 16%, or 18%, or 20%, or 25% by weight of the peroxide compound. In other embodiments, an aqueous composition containing a peroxide compound can comprise less than or equal to 25%, or 20%, or 18%, or 16%, or 14%, or 12%, or 10%, or 8%, or 6%, or 4%, or 2%, or 1%, or 0.5%, or 0.1% by weight of the peroxide compound. Useful ranges can be selected from any value between and inclusive of 0.1% to 25% by weight of the peroxide compound. Non-limiting examples of such ranges of the peroxide compound are: from 0.1% to 25%, from 0.5% to 25%, from 1% to 25%, from 2% to 25%, from 4% to 25%, from 6% to 25%, from 8% to 25%, from 10% to 25%, from 0.5% to 10%, from 2% to 8%, or from 3% to 7% by weight of the aqueous composition. In some embodiments, the aqueous composition comprises about 10% by weight of the peroxide compound. In some embodiments, the aqueous composition comprises about 5% by weight of the peroxide compound. In preferred embodiments, the peroxide compound is hydrogen peroxide.

The organic acid compound can be any organic acid that can effectively form a peracid upon reacting with a peroxide compound. Generally, these will include, but are not limited to, carboxylic acids. Non-limiting examples of carboxylic acids which can be used include formic acid, acetic acid, citric acid, succinic acid, oxalic acid, propanoic acid, lactic acid, benzoic acid, butanoic acid, pentanoic acid, octanoic acid, amino acids, and mixtures thereof. In some embodiments, an aqueous composition containing an organic acid compound can comprise at least 0.5%, or 1%, or 2%, or 5%, or 10%, or 15%, or 20%, or 25%, or 30%, or 35%, or 40%, or 45%, or 50%, by weight of the organic acid compound. In other embodiments, an aqueous composition containing an organic acid compound can comprise less than or equal to 50%, or 45%, or 40%, or 35%, or 30%, or 25%, or 20%, or 15%, or 10%, or 5%, or 2%, or 1%, or 0.5% by weight of the organic acid compound. Useful ranges can be selected from any value between and inclusive of 0.5% and 50% by weight of the organic acid compound. Non-limiting examples of such ranges of the organic acid compound are: from 0.5% to 50%, from 1% to 50%, from 2% to 50%, from 5% to 50%, from 10% to 50%, from 0.5% to 20%, from 0.5% to 10%, from 1% to 20%, from 2% to 15%, or from 5% to 10% by weight of the aqueous composition. In some embodiments, the aqueous composition comprises 10% by weight of the organic acid compound. In some embodiments, the aqueous composition comprises 8% by weight of the organic acid compound. In some embodiments, the organic acid compound is acetic acid. In some embodiments, the pH of the aqueous composition comprising acetic acid is less than 7.0.

In another embodiment, the aqueous compositions of any of the disinfectant systems described herein can be dispersed into a volumetric space and/or directly onto a surface by any means known in the art, including as a liquid stream or as a multiplicity of droplets. Methods by which a liquid composition can be dispersed as a multiplicity of droplets can be selected from the group consisting of: a coarse spray, mist, shower, aerosol, fog, and a vapor, including combinations thereof.

In another embodiment, one or more of the aqueous compositions within the disinfectant system can include non-aqueous compounds that lower the composition's surface tension, such as, as non-limiting examples, surfactants and/or alcohols. For example, pure ethanol has a surface tension of about 22.27 dyne/cm at 20° C., and relatively low levels of many surfactants have the ability to lower the surface tension of an aqueous composition to about 30 dyne/cm at 20° C., or lower. Without being limited by a particular theory, as the surface tension of the droplets decreases, the formed coalesced composition and/or reaction layers will spread over a higher proportion of the surface, at a less overall volume and effective uniform thickness, than coalesced composition and/or reaction layers having a higher surface tension.

Consequently, and in another embodiment, at least one, or both of the aqueous compositions further comprises at least one alcohol. The surface tension of an aqueous composition containing a peracid reactant compound and at least one alcohol, measured at 20° C., can be less than or equal to 72, or 60, or 50, or 45, or 40, or 35, or 30, or 25, or 20 dyne/cm. In some embodiments, the surface tension of an aqueous composition containing a peracid reactant compound and at least one alcohol, measured at 20° C., can be any value between and inclusive of 20 dyne/cm and 72 dyne/cm. In a further embodiment, at least one of the first aqueous composition and the second aqueous composition have a surface tension of less than or equal to about 30 dyne/cm at 20° C. In another embodiment, the surface tension of the first aqueous composition is less than 30 dyne/cm, the surface tension of the second aqueous composition can be less than or equal to 60, or 55, or 50, or 45, or 40, or 35, or 32.5 dyne/cm, when measured at 20° C.

Further, some alcohols also independently provide biocidal activity separate from the peracid. Consequently, and without being limited by a particular theory, using alcohols in combination with forming the peracid in situ on the surface to be disinfected may provide additive effects on the antimicrobial activity as compared to reaction layers which only contain a peroxide compound and an organic acid compound.

Advantageously, many alcohols have a sufficiently high vapor pressure to promote evaporation from a surface after the peracid has been formed and the surface has been disinfected. Accordingly, in some embodiments, aqueous compositions utilized in accordance with disinfectant systems of the present invention can have less than 0.01% by weight (100 ppm) of surfactants, and in further embodiments, are substantially free of surfactants, which generally have low or negligible vapor pressures, and can linger on a surface long after the surface has been disinfected if the surfactant residues aren't subsequently wiped off of the surface.

In an aqueous composition comprising a peracid reactant compound and one or more alcohols, the one or more alcohols can comprise at least 0.05%, or 0.1%, or 1%, or 2%, or 3%, or 4%, or 5%, or 10%, or 15%, or 20%, or 25%, or 30%, or 40%, or 50%, or 60%, or 70% by weight of the aqueous composition. In other embodiments, the one or more alcohols can comprise less than or equal to 70%, or 60%, or 50%, or 40%, or 30%, or 25%, or 20%, or 15%, or 10%, or 5%, or 4%, or 3%, or 2%, or 1%, or 0.1%, down to equal to 0.05% by weight of the aqueous composition. Useful ranges can be selected from any value between and inclusive of about 0.05% to 70% by weight of the alcohol. Non-limiting examples of such ranges of the alcohol are: from 0.05% to 70%, from 0.1% to 20%, from 1% to 15%, from 2% to 20%, from 3% to 5%, from 1% to 5%, from 2% to 5%, or from 2.0% up to 4.5% by weight of the aqueous composition. In some embodiments, an aqueous composition can comprise 4% by weight of the alcohol. In some embodiments, an aqueous composition can comprise 2.5% by weight of the alcohol.

The alcohol present in an aqueous composition can be a single alcohol compound or a combination of multiple alcohol compounds. Each alcohol compound can comprise a primary, secondary, or tertiary hydroxyl group, and can have aliphatic, alicyclic, aromatic, or carbon-containing structure having 1 to 24 carbon atoms, and in some embodiments, 2 to 8 carbon atoms. Non-limiting examples of monohydric aliphatic alcohols, alicyclic, aromatic, and unsaturated alcohols that can be used include methanol; ethanol; propanol; isopropanol; butanol; pentanol; hexanol; heptanol; octanol; nonanol; and decanol, including all constitutional isomers, stereoisomers, denatured alcohols and combinations thereof. Further, each alcohol compound can be straight-chained or branched, saturated or unsaturated, and/or monohydric or polyhydric. In some embodiments, non-aliphatic alcohols may also be utilized.

In another embodiment, for practical considerations, lower-chain alcohol compounds such as methanol, ethanol, isopropanol, t-butanol, and other aliphatic $C_1$-$C_4$ alcohols, and denatured alcohols thereof can be used because of their properties and cost. However, many alcohols, particularly primary alcohols, for example methanol and ethanol, can form low levels of a peracid upon reacting with hydrogen peroxide. Consequently, in some embodiments, isopropanol and t-butanol, as secondary and tertiary alcohols, respectively, can be chosen as alcohols because side reactions with the hydrogen peroxide to form a peracid are not favored.

However, although lower-chain alcohols are cheap, readily available, and effectively lower the surface tension of an aqueous composition, they can have particularly low flash points, and can combust when energetically dispersed in high concentrations as an aerosol or vapor, e.g. droplets having diameters less than 100 μm, less than 15 μm, or down to less than 1 μm. In preferred embodiments, aqueous compositions dispersed as an aerosol or a vapor have a flash point greater than about 40° C., more preferably greater than about 50° C., even more preferably greater than about 55° C., and still more preferably greater than about 60° C. Yet, even at dilute alcohol concentrations, compositions containing lower-chain alcohol compounds such as ethanol, isopropanol, and t-butanol can have a flash point of less than 40° C.

Neat forms of alcohol compounds having five or more carbon atoms generally have flash points that are higher than lower-chain alcohols, while being able to attain similar surface tensions as lower-chain alcohols. However, the solubility of an alcohol in an aqueous-based composition decreases dramatically once the alcohol contains four or more carbon atoms. For example, at 25° C., the solubility of n-butanol is 67 grams per liter, the solubility of n-pentanol is 22 grams per liter, the solubility of n-hexanol is 5.9 grams per liter, and the solubility of n-octanol are 0.5 grams per liter. Converted to percent by weight of an aqueous composition, the solubility of each compound is 6.7% by weight, 2.2% by weight, 0.59% by weight, and 0.05% by weight of the composition. As a result, many $C_5$ or greater alcohol compounds are not soluble enough to be added at high enough concentrations to an aqueous composition to lower the surface tension to less than or equal to 30 dyne/cm at 20° C.

However, and in some embodiments, a blend of alcohols comprising a first alcohol comprising at least one lower-chain alcohol compound, and a second alcohol comprising at least one $C_5$- or greater alcohol compound, can lower the surface tension of an aqueous composition to less than or equal to 30 dyne/cm at 20° C. while also maintaining a flash point greater than 50° C. Without being limited by a particular theory, it is believed that the addition of a lower-chain alcohol to a composition comprising a $C_5$ or greater alcohol can increase the number of alcohol compound molecules within the composition, lowering the surface tension. Simultaneously, the presence of the $C_5$ or greater alcohol can reduce the amount of lower-chain alcohol necessary to lower the surface tension without adversely decreasing a composition's flash point.

In another embodiment, the one or more $C_5$- or greater alcohol compounds within the alcohol blend can be soluble enough in water to minimize the amount of the lower-chain alcohol within the aqueous composition. For example, the solubility of the alcohol compound in water, measured at 25° C., can be greater than 5, or 10, or 15, or 20, or 25, or 30, or 35 grams per liter (g/L), up to 40 g/L. In another embodiment, the water solubility of the one or more $C_5$- or greater alcohol compounds, measured at 25° C., can be less than 40, or 35, or 30, or 25, or 20, or 15, or 10 g/L, down to 5 g/L. In another embodiment, the water solubility of the one or more $C_5$- or greater alcohol compounds within the alcohol blend, measured at 25° C., can be any value or range between and inclusive of 5 g/L and 40 g/L, for example, at least 10 g/L and up to 30 g/L.

However, when the aqueous composition containing the alcohol blend is volatilized, it may be preferable to control the concentration of each of the alcohol to avoid lens formation at the composition surface. Without being limited by a particular theory, it is believed that one or more lenses can form when the concentration of a single alcohol, or a blend of two or more alcohols, is no longer miscible with the aqueous solvent once the alcohol compound(s)' solubility limits are exceeded. As a result, the non-miscible alcohol compounds congregate into a lens, and the flash point of that lens can approximately equivalent to the flash point of the pure alcohol. Accordingly, the benefit of using an alcohol blend to suppress a reduction in the flash point of the composition can be lost by adding too much alcohol to the composition.

In another embodiment, an alcohol compound can be described by its partition coefficient P, or the logarithm of its partition coefficient (Log P). A partition coefficient is the ratio of concentrations of a solute between two solvents, specifically for un-ionized solvents, expressed as a ratio of concentrations in octanol with respect to water, indicating a measure of hydrophobicity of the solute. Generally, the Log P of a compound increases as a compound's water solubility decreases. However, solubility and Log P are not directly proportional, particularly as the alcohol compound becomes more complex. In another embodiment, in their neat form, each of the one or more $C_5$- or greater alcohol compounds within the alcohol blend can have a log P of at least 1.20, or 1.30, or 1.40, or 1.50, or 1.60, or 1.70, or 1.80, or 1.90, or 2.00, or 2.10, up to at least 2.20. In another embodiment, in their neat form, each of the one or more $C_5$- or greater alcohol compounds within the alcohol blend can have a log P of less than 2.20, or 2.10, or 2.00, or 1.90, or 1.80, or 1.70, or 1.60, or 1.50, or 1.40, or 1.30, down to 1.20. In another embodiment, the Log P of the one or more $C_5$- or greater alcohol compounds within the alcohol blend can be any value or range between and inclusive of 1.20 and 2.20, for example, from at least 1.40, and up to 2.0.

Alcohol compounds having any of the above water solubility and Log P values can be identified using an online chemical database, such as PubMed or ChemSpider. Within ChemSpider, predicted physical properties are calculated by the ACD/Labs Percepta platform. In particular, Log P can be predicted via the ACD/Labs LogP platform or using the Molinspiration Property Calculation Service. Generally, experimental solubility values for each alcohol compound in their pure form were collected from Yalkwosky, S. H., et al., (2010) Handbook of Aqueous Solubility Data, Second Edition, CRC Press, Boca Raton, FL). Non-limiting examples of compounds having a Log P between 1.20 and 2.0 and both predicted and experimental water solubility values within the 10 g/L to 30 g/L range are: n-pentanol; 2-methyl-1-butanol; 3-methyl-1-butanol; 3,3-dimethyl-2-butanol; 4-methyl-2-pentanol; 2-methyl-3-pentanol; 3-methyl-2-pentanol; 2-hexanol; 3-hexanol; phenol; 4-methyl phenol; phenylethyl alcohol; and 1-phenylethanol.

Several aqueous compositions with alcohol blends comprising ethanol and selected $C_5$-$C_8$ alcohol compounds identified by the database search-n-pentanol, 2-hexanol, and 3-hexanol-were experimentally tested and/or modeled for both flash point and surface tension, the details of which are described in the Examples section, below. In another embodiment, aqueous compositions comprising any of the above alcohol blends, while having a flash point above 50° C. and a surface tension below 30 dyne/cm at 20° C., have a total alcohol concentration of at least 2.0%, and up to 4.5% by weight of the aqueous composition. As non-limiting examples, an aqueous composition comprising 8% by weight acetic acid, 0.2% by weight ethanol, and 2.0% by weight n-propanol, and an aqueous composition comprising 8% by weight acetic acid, 3.2% by weight ethanol, and 0.9% by weight n-propanol were both modeled and found to have a flash point above 50° C. and a surface tension below 30 dyne/cm at 20° C. Accordingly, in another embodiment, the mass ratio of the lower-chain alcohol relative to the $C_5$-$C_8$ alcohol compound can be in a range from at least 1:10, and up to 4:1.

In another embodiment, some alcohol blends of the present invention can comprise more than two alcohol compounds. In further embodiments, an alcohol blend can further comprise isopropanol and n-butanol. As a non-limiting example, commercially-available ethanol can be obtained as a 90% (v/v) solution with isopropanol and water. In another non-limiting example, n-butanol can be used to solubilize a blend of one or more natural biocides or natural biocidal compounds to be included within an aqueous composition. In another embodiment, either or both of the isopropanol and the n-butanol can comprise at least 0.1% by weight, and up to 0.5% by weight of the aqueous composition.

In another embodiment, aqueous compositions comprising hydrogen peroxide can further comprise any of the alcohol blends above. In another embodiment, aqueous compositions comprising a hydrogen peroxide can comprise a single alcohol compound. In another embodiment, the one or more alcohol compounds comprised within an aqueous composition comprising hydrogen peroxide can consist of secondary or tertiary alcohol compounds. In a further embodiment, the one or more secondary or tertiary alcohol compounds can be selected from the group consisting of isopropanol, 2-butanol, t-butanol, 3,3-dimethyl-2-butanol; 4-methyl-2-pentanol; 2-methyl-3-pentanol; 3-methyl-2-pentanol; 2-hexanol; 3-hexanol; and 1-phenylethanol, including combinations thereof. Without being limited by a particular theory, it is believed that the use of a secondary or tertiary alcohol precludes the formation of a peracid from the oxidation of a primary alcohol by hydrogen peroxide. It is also believed that as opposed to primary alcohols such as ethanol and benzyl alcohol, secondary and tertiary alcohols are more sterically-hindered, and resistant to auto-oxidation to form an aldehyde, which itself can be auto-oxidized to form a carboxylic acid.

In another embodiment, additional compounds can be included in either aqueous composition to enhance or supplement the effectiveness of the peracid generated in situ on the surface to be disinfected. Such compounds can include one or more natural biocides, such as manuka honey and essential oils, and/or natural biocidal compounds typically found within manuka honey and essential oils, such as methylglyoxal, carvacrol, eugenol, linalool, thymol, p-cymene, myrcene, borneol, camphor, caryophillin, cinnamaldehyde, geraniol, nerol, citronellol, and menthol, including combinations thereof. Non-limiting examples of essential oils that can be included in one or more of the aqueous compositions include the essential oils of oregano, thyme, lemongrass, lemons, oranges, anise, cloves, aniseed, cinnamon, geraniums, roses, mint, peppermint, lavender, citronella, eucalyptus, sandalwood, cedar, rosmarin, pine, vervain fleagrass, and ratanhiae. In some embodiments, one or more natural biocides or natural biocidal compounds, particularly essential oils and/or their chemical components, can be included in an aqueous composition at a concentration of at least 0.001%, or 0.005%, or 0.01%, or 0.05%, or 0.1%, or 0.25%, or 0.5% by weight, up to 1% by weight. In other embodiments, the natural biocidal blend can comprise less than or equal to 1%, or 0.5%, or 0.25%, or 0.1%, or 0.05%, or 0.01%, or 0.005% by weight, down to 0.001% by weight. Useful ranges can be selected from any value between and inclusive of 0.001% to 1% by weight of the aqueous composition, a non-limiting example of which is at least 0.001%, and up to 0.5% by weight.

An advantage of many of the components described above, particularly the peracid reactant compounds, alcohol compounds, and natural biocidal blends, is that they can be easily volatilized after the sterilization is complete. Without being limited by a particular theory, if the selection of the components within the aqueous composition is controlled so that substantially all of the reaction layer is able to evaporate quickly, the post-disinfection wiping down of surfaces, which is typically required according to traditional practices, can be eliminated. Formulating the aqueous compositions to have a high volatility generally requires that non-volatile salts, surfactants, high-molecular weight materials, and other additives can be used sparingly or omitted completely in order to promote high turnover of the volumetric space containing the surfaces to be disinfected. In some embodiments, the aqueous compositions can be formulated to have a volatility such that at least 90%, or 95%, or 99%, or 99.5%, or 99.7%, or 99.9% by weight, up to 100% by weight of the reaction layer evaporates within 30 minutes.

To enhance the volatility of the aqueous compositions after they are deposited on one or more surfaces, the individual components of each of the aqueous compositions can be selected to have a relatively higher standard vapor pressure compared to less labile components that remain on surfaces long after they are disinfected. Thus, in another embodiment, one or both of the aqueous compositions can be formulated so at least about 99.0% by weight, at least about 99.5% by weight, or at least about 99.9% by weight of the components have a standard vapor pressure of at least 1.0 mm Hg at 20° C.

In other embodiments, however, it can be advantageous to include additional components in at least one of the aqueous compositions in order to supplement or enhance the disinfection of surfaces within a volumetric space, particularly in situations in which the volatility of the aqueous compositions once they have been deposited onto surfaces is not a concern. Such additional components can include, but are not limited to surfactants, as described above, as well as polymers, chelators, metal colloids and/or nanoparticles, oxidizers, and other chemical additives, including combinations thereof.

In another embodiment, any of the disinfectant systems of the present invention described above can be used for a variety of user-identified biocidal purposes, including antimicrobial, bleaching, or sanitizing applications. In other aspects, the disinfectant systems are the present invention are effective against a wide variety of microorganisms, such as Gram-positive organisms (*Listeria monocytogenes* or *Staphylococcus aureus*); Gram-negative organisms (*Escherichia coli* or *Pseudomonas aeruginosa*); catalase-positive organisms (*Micrococcus luteus* or *Staphylococcus epidermidis*); sporulent organisms (*Bacillus subtilis*); drug-resistant and non-drug-resistant forms of one or more of the following organisms: *Acinetobacter baumannii; Enterococcus faecium; Enterobacter aerogenes; Escherichia coli, Klebsiella pneumoniae*; norovirus; herpes simplex virus; hepatitis; human immunodeficiency virus; severe acute respiratory syndrome (SARS) coronavirus; influenza; rhinovirus; *Trichophyton interdigitale, Candida auris; Clostridium difficile*, and SARS strains 1 and/or 2 (SARS-COV-1 and SARS-COV-2).

EXAMPLES

The following working and prophetic examples are offered to illustrate, but not to limit, the claimed invention. For avoidance of doubt, any examples relating to subject-matter outside the scope of the claims is included for reference only.

Example 1: Identification of $C_5$-$C_8$ Alcohol Compounds for Use in Alcohol Blends A study was conducted to identify monohydric alcohol compounds having a Log P of at least 1.20 and up to 2.00, and a water solubility, measured at 25° C., between 10 g/L and 30 g/L, as candidates to be combined into alcohol blends that can lower the surface tension of an aqueous composition to below 30 dyne/cm at 20° C. while also maintaining a composition flash point above 50° C. Compounds were initially identified using the ChemSpider online database. Search limitations included an ACD/LogP of 1.20 to 2.00 and a single hydrogen bond acceptor, and were conducted serially using on the empirical formula CxHyO. Alcohol compounds comprising 4 to 7 carbon atoms, as well as selected $C_8$-alcohol compounds, were queried.

Generally, each search hit included an ACD/Labs predicted Log P, and an experimental water solubility determined by the U.S. Environmental Protection Agency's EPISuite™, and some entries contained experimental Log P and/or solubility values for the alcohol compound. However, in a study that evaluated the accuracy of predicted Log P values for non-ionic compounds, such as alcohol compounds, the Molinspiration Property Calculation Service (MPCS) was determined to be one of the best freely-available prediction suites (see Hodges, G., et al, (2019) *Environ. Sci. Eur.* 31:1-18, the disclosure of which is incorporated by reference in its entirety. The SMILES string for each alcohol compound identified within ChemSpider was inserted as a query within MPCS to determine its predicted Molinspiration Log P value. When the ChemSpider entry for a particular alcohol compound did not contain an experimentally-determined water solubility, the water solubility at 25° C. was modeled by generating a standard curve of several alcohol compounds that had known Log P and solubility values, regardless of the number of carbons present. The alcohol compounds included in the standard curve, and their Log P and water solubility values, are shown below in Table 1.

TABLE 1

Log P and Water Solubility of Common Alcohols

| Compound Name | Log P | Solubility (at 25° C.) (g/L) |
|---|---|---|
| n-pentanol | 1.51 | 22.0 |
| 2-hexanol | 1.76 | 13.7 |
| 3-hexanol | 1.65 | 16.1 |
| 2-pentanol | 1.19 | 44.6 |
| 3-pentanol | 1.21 | 51.5 |
| 2-methyl-1-butanol | 1.29 | 29.7 |
| 3-methyl-1-butanol | 1.16 | 26.7 |
| n-hexanol | 2.03 | 5.9 |
| n-butanol | 0.88 | 63.2 |
| 2-butanol | 0.61 | 181 |
| n-propanol | 0.25 | 1000* |
| t-amyl alcohol | 0.89 | 110 |

The plot of Log P as a function of water solubility, illustrated in FIG. 1, indicates a hyperbolic relationship, with an $R^2$ of over 95% indicating a good fit. Although alcohol compounds that have a more complex structure than those in Table 1, particularly those that are alicyclic, aromatic, or unsaturated are likely to deviate at least somewhat, and potentially significantly, for some alcohol compounds, it is nonetheless believed that the equation from the hyperbolic best fit curve can reasonably predict the water solubility of many alcohol compounds from the MPCS Log P.

In Table 2 below, the ACD/Labs predicted Log P, the MPCS predicted Log P, and estimated water solubility of 158 alcohol compounds are listed. Each compound in the table has an estimated water solubility between 10 g/L and 30 g/L, if it were measured at 25° C. If an alcohol compound has an experimentally determined Log P or solubility, that is also listed.

TABLE 2

Experimental and Predicted Physical Properties of Identified Alcohol Compounds

| Name | log P ACD | log P Exp. | log P MPCS | Sol (Est) | Sol (Exp) |
|---|---|---|---|---|---|
| 1-Pentyn-1-ol | 2.30 | | 1.34 | 26.65 | |
| 3-Methyl-1,3-butadien-2-ol | 1.39 | | 1.81 | 13.25 | |
| 2,4-Pentadien-2-ol | 1.36 | | 1.52 | 19.88 | |
| 1,4-Pentadien-2-ol | 1.56 | | 1.54 | 19.29 | |
| 3-Methyl-2-buten-1-ol | 1.24 | 1.244 | 1.36 | 25.75 | |
| 3-Methyl-2-buten-2-ol | 1.89 | | 2.03 | 10.15 | |
| 1-Penten-1-ol | 1.85 | | 1.53 | 19.58 | |
| 2-Penten-2-ol | 1.87 | | 1.75 | 14.33 | |
| 2-Methyl-1-buten-1-ol | 1.87 | | 1.28 | 29.65 | |
| 2-Penten-3-ol | 1.87 | | 1.75 | 14.33 | |
| 3-Methyl-1-butanol | 1.22 | 1.16 | 1.33 | 27.12 | 26.7 |
| 2-Methyl-1-butanol | 1.22 | 1.29 | 1.3 | 28.60 | 29.7 |
| 2-Pentanol | 1.22 | 1.19 | 1.48 | 21.16 | 44.6 |
| 3-Pentanol | 1.22 | 1.21 | 1.43 | 22.91 | 51.5 |
| n-pentanol | 1.41 | 1.51 | 1.62 | 17.15 | 22 |
| phenol | 1.48 | 1.46 | 1.46 | 21.84 | 82 |
| 1,3,5-Hexatrien-3-ol | 1.38 | | 1.79 | 13.60 | |
| 4-Methyl-4-penten-2-yn-1-ol | 1.72 | | 1.47 | 21.49 | |
| 5-Hexen-3-yn-2-ol | 1.52 | | 1.28 | 29.65 | |
| 1,3-Cyclohexadien-1-ol | 1.55 | | 1.66 | 16.20 | |
| 1,5-Cyclohexadien-1-ol | 1.49 | | 1.9 | 11.84 | |
| 2-Methyl-1-penten-3-yn-1-ol | 2.20 | | 1.38 | 24.89 | |
| 3-Methyl-1,4-pentadien-3-ol | 1.22 | | 1.4 | 24.07 | |
| 3-Methylene-4-penten-2-ol | 1.28 | | 1.27 | 30.19 | |
| 2,4-Hexadien-1-ol | 1.36 | 1.334 | 1.09 | 43.07 | |
| 2-Methyl-2,4-pentadien-1-ol | 1.39 | | 1.39 | 24.48 | |
| 3-Methyl-2,4-pentadien-1-ol | 1.39 | | 1.39 | 24.48 | |
| 4-methylpenta-2,3-dien-1-ol | 1.38 | | 1.29 | 29.11 | |
| 4-Methyl-2,4-pentadien-1-ol | 1.39 | | 1.39 | 24.48 | |
| 3-Methyl-2-methylene-3-buten-1-ol | 1.49 | | 1.46 | 21.84 | |
| 2-Methyl-1,4-pentadien-3-ol | 1.43 | | 1.5 | 20.51 | |
| 1,3-Hexadien-1-ol | 1.86 | | 1.26 | 30.75 | |
| 4-Methyl-1-pentyn-1-ol | 2.65 | | 1.55 | 19.00 | |
| 2-Methyl-1-cyclopenten-1-ol | 1.94 | | 1.72 | 14.92 | |

TABLE 2-continued

Experimental and Predicted Physical Properties of Identified Alcohol Compounds

| Name | log P ACD | log P Exp. | log P MPCS | Sol (Est) | Sol (Exp) |
|---|---|---|---|---|---|
| 1,5-Hexadien-2-ol | 1.90 | | 2.05 | 9.92 | |
| 3-Methyl-1-cyclopenten-1-ol | 1.84 | | 1.65 | 16.43 | |
| 1,5-Hexadien-1-ol | 1.82 | | 1.52 | 19.88 | |
| 3-Methyl-1-pentyn-1-ol | 2.65 | | 1.52 | 19.88 | |
| 4-Methyl-1,3-pentadien-1-ol | 1.88 | | 1.53 | 19.58 | |
| (2-Ethylcyclopropyl)methanol | 1.20 | | 1.66 | 16.20 | |
| 2-Ethylcyclobutanol | 1.24 | | 1.32 | 27.60 | |
| 2-Ethyl-1-methylcyclopropanol | 1.21 | | 1.6 | 17.65 | |
| 2-Propylcyclopropanol | 1.20 | | 1.72 | 14.92 | |
| 2-(2-Methylcyclopropyl)ethanol | 1.20 | | 1.43 | 22.91 | |
| 1-Ethyl-2-methylcyclopropanol | 1.21 | | 1.6 | 17.65 | |
| 2-Methylcyclopentanol | 1.27 | | 1.32 | 27.60 | |
| 1-Ethylcyclobutanol | 1.28 | | 1.29 | 29.11 | |
| cyclohexanol | 1.34 | 1.23 | 1.59 | 17.91 | |
| 1-Methylcyclopentanol | 1.32 | | 1.53 | 19.58 | |
| 3-Methyl-1-penten-3-ol | 1.40 | | 1.64 | 16.67 | |
| 5-Hexen-2-ol | 1.37 | | 1.47 | 21.49 | |
| 4-Methyl-1-penten-3-ol | 1.40 | | 1.43 | 22.91 | 30.6 |
| 3-Methyl-4-penten-1-ol | 1.37 | | 1.34 | 26.65 | |
| 2-Methyl-4-penten-1-ol | 1.37 | | 1.34 | 26.65 | |
| 2,3-Dimethyl-3-buten-2-ol | 1.42 | | 1.68 | 15.76 | |
| 5-Hexen-3-ol | 1.44 | | 1.46 | 21.84 | |
| 2-Ethyl-3-buten-1-ol | 1.44 | | 1.57 | 18.44 | |
| 5-Hexen-1-ol | 1.50 | | 1.61 | 17.40 | |
| 4-Hexen-1-ol | 1.54 | | 1.35 | 26.20 | |
| 4-Methyl-4-penten-1-ol | 1.57 | | 1.41 | 23.68 | |
| 3-Hexen-1-ol | 1.61 | | 1.35 | 26.20 | |
| 4-Methyl-3-penten-1-ol | 1.63 | | 1.63 | 16.90 | |
| 2-Methyl-1-penten-3-ol | 1.60 | | 1.74 | 14.52 | |
| 3-Methyl-3-penten-1-ol | 1.63 | | 1.39 | 24.48 | |
| 3-Methylene-2-pentanol | 1.6 | | 1.5 | 20.51 | |
| 3-Methyl-2-methylene-1-butanol | 1.6 | | 1.39 | 24.48 | |
| 2-Hexen-1-ol | 1.75 | | 1.88 | 12.13 | |
| 2-Methyl-2-penten-1-ol | 1.78 | | 1.63 | 16.90 | |
| 3-Methyl-2-penten-1-ol | 1.78 | | 1.63 | 16.90 | |
| 2-Ethyl-2-buten-1-ol | 1.78 | | 1.39 | 24.48 | |
| 2-Methylene-1-pentanol | 1.78 | | 1.7 | 15.33 | |
| 1-Hexen-1-ol | 2.38 | | 2.04 | 10.04 | |
| 2-Methyl-1-penten-1-ol | 2.4 | | 1.84 | 12.76 | |
| 3,3-Dimethyl-1-buten-1-ol | 2.02 | | 1.56 | 18.72 | |
| 3,3-Dimethyl-2-butanol | 1.39 | 1.48 | 1.75 | 14.33 | 24.3 |
| 2,3-Dimethyl-2-butanol | 1.39 | | 1.61 | 17.40 | 43.5 |
| 3,3-Dimethyl-1-butanol | 1.57 | | 1.65 | 16.43 | 7.6 |
| 4-Methyl-2-pentanol | 1.57 | | 1.7 | 15.33 | 16.4 |
| 3-Methyl-3-pentanol | 1.57 | | 1.87 | 12.28 | 42.6 |
| 2,2-Dimethyl-1-butanol | 1.57 | | 1.72 | 14.92 | 7.6 |
| 2-Methyl-3-pentanol | 1.57 | | 1.67 | 15.98 | 20.1 |
| 3-Methyl-2-pentanol | 1.57 | | 1.67 | 15.98 | 19.4 |
| 4-Methyl-1-pentanol | 1.75 | | 1.6 | 17.65 | 7.6 |
| 2-Hexanol | 1.75 | 1.76 | 1.99 | 10.63 | 13.7 |
| 2-Ethyl-1-butanol | 1.75 | | 1.81 | 13.25 | 4 |
| 3-hexanol | 1.75 | 1.65 | 1.98 | 10.76 | 16.1 |
| 2-Methyl-1-pentanol | 1.75 | | 1.86 | 12.44 | 6 |
| 3-Methyl-1-pentanol | 1.75 | | 1.58 | 18.17 | 4.3 |
| 1,3,6-Cycloheptatrien-1-ol | 1.44 | | 1.67 | 15.98 | |
| Bicyclo[2.2.1]hepta-2,5-dien-2-ol | 1.34 | | 1.75 | 14.33 | |
| 1-(2,4-Cyclopentadien-1-ylidene)ethanol | 1.43 | | 1.51 | 20.19 | |
| 2,6-Heptadien-4-yn-1-ol | 1.70 | | 1.44 | 22.55 | |
| 6-Methylene-1,3-cyclohexadien-1-ol | 1.59 | | 1.73 | 14.72 | |
| 4,6-Heptadien-2-yn-1-ol | 1.72 | | 1.44 | 22.55 | |
| 3,5-Heptadiyn-1-ol | 1.61 | | 1.52 | 19.88 | |
| 3,5-Heptadiyn-2-ol | 1.79 | | 1.61 | 17.40 | |
| 5-Methylene-1,3-cyclohexadien-1-ol | 1.63 | | 1.73 | 14.72 | |
| 4-methyl phenol | 1.94 | 1.94 | 1.91 | 11.69 | 21.5 |
| 2-methyl phenol | 1.94 | 1.95 | 2.33 | 7.37 | 25.9 |
| 3-methyl phenol | 1.94 | | 1.88 | 12.13 | |
| 4,6-Heptadiyn-3-ol | 2.44 | | 1.3 | 28.60 | |
| 2,4-Heptadiyn-1-ol | 1.98 | | 1.75 | 14.33 | |
| 1,6-Heptadien-4-yn-3-ol | 2.15 | | 1.55 | 19.00 | |
| 3-Ethyl-1-penten-4-yn-3-ol | 1.20 | | 1.42 | 23.29 | |
| 2,3-Dimethyl-1-penten-4-yn-3-ol | 1.23 | | 1.47 | 21.49 | |

TABLE 2-continued

Experimental and Predicted Physical Properties of Identified Alcohol Compounds

| Name | log P ACD | log P Exp. | log P MPCS | Sol (Est) | Sol (Exp) |
|---|---|---|---|---|---|
| 6-Hepten-3-yn-2-ol | 1.25 | | 1.55 | 19.00 | |
| 4-Methyl-5-hexen-2-yn-1-ol | 1.25 | | 1.67 | 15.98 | |
| 1-Hepten-5-yn-3-ol | 1.27 | | 1.55 | 19.00 | |
| 4-Methyl-2,4-cyclohexadien-1-ol | 1.24 | | 1.39 | 24.48 | |
| 5-Methyl-4-hexen-1-yn-3-ol | 1.40 | | 1.5 | 20.51 | |
| 2-Methyl-1-hexen-5-yn-3-ol | 1.36 | | 1.29 | 29.11 | |
| 6-Hepten-2-yn-1-ol | 1.32 | | 1.7 | 15.33 | |
| hept-1-en-5-yn-4-ol | 1.33 | | 1.55 | 19.00 | |
| 2,4,6-Heptatrien-1-ol | 1.34 | | 1.36 | 25.75 | |
| 2-Methylene-4-hexyn-1-ol | 1.34 | | 1.51 | 20.19 | |
| 3-Methyl-2,4,5-hexatrien-1-ol | 1.40 | | 1.32 | 27.60 | |
| 5-Hepten-2-yn-1-ol | 1.42 | | 1.44 | 22.55 | |
| 5-Methyl-5-hexen-2-yn-1-ol | 1.45 | | 1.74 | 14.52 | |
| 2-Methyl-2,3,5-hexatrien-1-ol | 1.47 | | 1.32 | 27.60 | |
| 1-Hepten-4-yn-3-ol | 1.51 | | 1.79 | 13.60 | |
| 4-Methylene-1,5-hexadien-3-ol | 1.51 | | 1.54 | 19.29 | |
| 6-Hepten-4-yn-1-ol | 1.56 | | 1.46 | 21.84 | |
| 3-Vinyl-2,4-pentadien-1-ol | 1.53 | | 1.43 | 22.91 | |
| 2-Methyl-1,4,5-hexatrien-3-ol | 1.56 | | 1.44 | 22.55 | |
| 4-Methyl-1,4,5-hexatrien-3-ol | 1.56 | | 1.44 | 22.55 | |
| 6-Hepten-4-yn-2-ol | 1.69 | | 1.55 | 19.00 | |
| 3-Hepten-5-yn-2-ol | 1.70 | | 1.53 | 19.58 | |
| 2-Methyl-5-hexen-3-yn-1-ol | 1.69 | | 1.67 | 15.98 | |
| 1,4,6-Heptatrien-3-ol | 1.67 | | 1.48 | 21.16 | |
| Bicyclo[2.2.1]hept-2-en-2-ol | 1.76 | | 1.77 | 13.96 | |
| 3-Methylene-4-hexyn-1-ol | 1.77 | | 1.51 | 20.19 | |
| 2-Methyl-5-hexen-3-yn-2-ol | 1.87 | | 1.73 | 14.72 | |
| 5-Hepten-3-yn-1-ol | 1.86 | | 1.44 | 22.55 | |
| 2-Hepten-4-yn-1-ol | 1.88 | | 1.68 | 15.76 | |
| 5-Methyl-5-hexen-3-yn-1-ol | 1.89 | | 1.74 | 14.52 | |
| 1,3-Cyclohexadien-1-ylmethanol | 1.91 | | 1.3 | 28.60 | |
| 2,3-Dimethyl-2-penten-4-yn-1-ol | 1.91 | | 1.45 | 22.19 | |
| 3-methylhex-2-en-4-yn-1-ol | 1.90 | | 1.72 | 14.92 | |
| 1-(1-Cyclopenten-1-yl)ethenol | 1.92 | | 1.75 | 14.33 | |
| 2-Methyl-2-hexen-4-yn-1-ol | 1.90 | | 1.72 | 14.92 | |
| 6-Methyl-1,4-cyclohexadien-1-ol | 1.98 | | 1.41 | 23.68 | |
| 2-Vinyl-1,4-pentadien-1-ol | 1.91 | | 1.35 | 26.20 | |
| 5-Methyl-5-hexen-3-yn-2-ol | 2.07 | | 1.83 | 12.92 | |
| 5-Hepten-3-yn-2-ol | 2.04 | | 1.53 | 19.58 | |
| 6-Hepten-4-yn-3-ol | 2.05 | | 1.79 | 13.60 | |
| 2,4-Dimethyl-3-pentanol | 1.92 | | 1.91 | 11.69 | 7 |
| 2,3,3-Trimethyl-2-butanol | 1.74 | | 2.19 | 8.51 | 22 |
| 2,4-Dimethyl-2-pentanol | 1.92 | | 2.14 | 8.98 | 13.6 |
| 4,4-Dimethyl-2-pentanol | 1.92 | | 2.02 | 10.27 | |
| 2,3-Dimethyl-3-pentanol | 1.92 | | 2.12 | 9.18 | 16.4 |
| 2,3-Dimethyl-2-pentanol | 1.92 | | 2.12 | 9.18 | 15.7 |
| 2,2,3-Trimethyl-1-butanol | 1.92 | | 1.96 | 11.01 | |
| Bicyclo[4.2.0]octa-1,3,5-trien-3-ol | 2.04 | | 1.61 | 17.40 | |
| 5-Cyclopropyl-2,4-pentadiyn-1-ol | 1.81 | | 1.74 | 14.52 | |
| (4-Methylene-2,5-cyclohexadien-1-ylidene)methanol | 1.54 | | 1.34 | 26.65 | |
| (6-Methylene-2,4-cyclohexadien-1-ylidene)methanol | 1.54 | | 1.29 | 29.11 | |
| Phenylethyl alcohol | 1.36 | | 1.49 | 20.83 | 22.4 |
| 1-Phenylethanol | 1.38 | | 1.5 | 20.51 | 14.7 |

Among the 158 compounds listed in Table 2, there are 13 alcohol compounds, n-pentanol, 2-methyl-1-butanol, 3-methyl-1-butanol, 3,3-dimethyl-2-butanol, 4-methyl-2-pentanol, 2-methyl-3-pentanol, 3-methyl-2-pentanol, 2-hexanol, 3-hexanol, phenol, 4-methyl phenol, phenylethyl alcohol, and 1-phenylethanol, which had both estimated and experimental water solubility values between 10 g/L and 30 g/L. Of these, aqueous compositions comprising alcohol blends having n-propanol, 2-hexanol, and/or 3-hexanol were formulated and tested for flash point and surface tension.

Example 2: Aqueous Compositions for Flash Point and Surface Tension Determination Two separate aqueous compositions, one containing acetic acid and one containing hydrogen peroxide, were prepared. An aqueous composition comprising the acetic acid was prepared as the first aqueous composition, and contained both an alcohol blend and a natural biocidal blend. A composition comprising hydrogen peroxide was prepared that contained just a single alcohol compound, isopropanol.

| First Aqueous Composition |
| --- |
| 8% (w/w) acetic acid |
| 1.9% (w/w) ethanol |
| 0.1% (w/w) isopropanol |
| 0.9% (w/w) n-pentanol |
| 0.3% (w/w) natural biocidal blend |
| 87.1% (w/w) distilled water |
| **Second Aqueous Composition** |
| 5% (w/w) hydrogen peroxide |
| 2% (w/w) isopropanol |
| 93% (w/w) distilled water |
| **Natural Biocidal Blend** |
| 66.44% (w/w) n-butanol |
| 4.65% (w/w) cinnamic aldehyde |
| 1.99% (w/w) isoeugenol |
| 0.33% (w/w) thymol |
| 0.50% (w/w) carvacrol |
| 21.93% (w/w) phenyl ethyl alcohol |
| 2.33% (w/w) hexyl acetate |
| 1.83% (w/w) eucalyptus oil |

Based on the 0.3% by weight concentration of the natural biocidal blend within the first aqueous composition, the total concentration of n-butanol with the composition was 0.2% by weight. Both compositions were homogenous, with no visible lens formation. Both compositions were placed in separate containers for further testing.

Example 3: Flash Point Determination of Aqueous Compositions

The flash point of the aqueous compositions of Example 2 where determined, using a Pensky-Martens Closed Cup flash point test conducted in accordance with American Society for the Testing of Materials (ASTM) D93, Standard Test Methods for Flash Point by Pensky-Martens Closed Cup Tester, which can be used for determining the flash point of petroleum products over a temperature range of 40° C. to 360° C.

Observed flash point temperatures were corrected using the equation, FP=T+0.033 (760-P), wherein T=Observed flash point temperature (° C.) and P=Barometric pressure (mm Hg). The actual flash point of the sample was then reported as the corrected temperature. The corrected temperature was rounded to the nearest 0.5° C.

Two samples were tested of the first aqueous composition from Example 2. The observed flash points were 56° C. (+/−1° C.) and 55° C. (+/−1° C.), which were corrected to 56.5° C. (+/−1° C.) and 55.5° C. (+/−1° C.), respectively. Two samples were also tested of the second aqueous composition from Example 2. The observed flash points for both samples were 63° C. (+/−1° C.), which were both corrected to 63.5° C. (+/−1° C.).

Example 4: Determination of Aqueous Composition Surface Tension

The surface tensions of the aqueous compositions of Example 2 were determined by measuring the height of a liquid column of the composition within a capillary tube. Generally, several drops of a composition were pipetted into one or more wells within a multi-well porcelain spot plate until the cavity was filled to within 1-mm from the top surface. Upon dipping a capillary tube, such as a microhematocrit capillary tube, into the center of the cavity to draw up liquid, the bottom of the tube was sealed with Sigilium wax and placed into a capillary tube holding tray. Several additional samples were prepared from other cavities within the spot plate, using additional capillary tubes. The height of the liquid in each tube was measured using a caliper or other measuring device capable of reading at 0.01-mm increments, from a point at the top of the wax seal to the meniscus of the fluid within the tube.

The column height of compositions within multiple capillary tubes in the same test set were compared against each other to determine a mean and standard deviation across the entire data set. Most data sets contained at least 6 tubes. Data points that were more than 2 standard deviations away from the mean are discarded. Each data set also typically contained standards consisting of a deionized water composition (72 dyne/cm at 20° C.) and pure ethanol (22 dyne/cm at 20° C.). By including the two standards in each data set, a temperature-corrected curve for the change in surface tension as a function of ethanol concentration could be generated, using surface tensions reported by Vasquez, et al., above.

Figure 2:
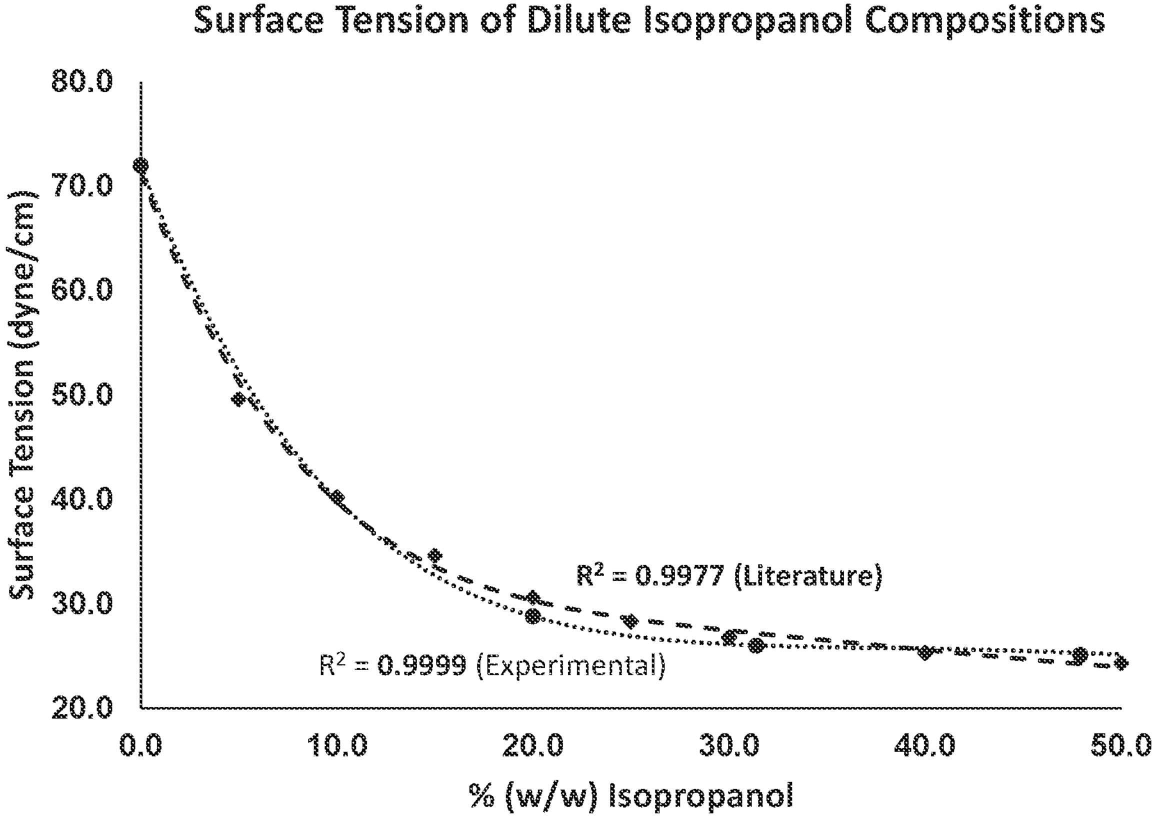
FIG. 2 shows a standard curve of surface tensions of isopropanol compositions measured using a capillary tube-based method, overlaid with isopropanol composition surface tensions from the literature.

The method was verified by comparing the column height of experimentally prepared dilutions of isopropanol, using deionized water and 100% (w/w) isopropanol compositions, respectively, as the two standards. A standard curve of the surface tension of known concentrations of dilute isopropanol compositions was generated, using data from Vasquez, et al. The line of best fit was a sixth-order polynomial, having an $R^2$ value of 99.8%, as shown in FIG. 2. The column heights of the two standards were plotted against the isopropanol concentration (either 0% w/w or 100% w/w) to generate an equation defining the linear relationship between the height of the liquid inside each capillary tube and the surface tension of the liquid. Several sets of compositions of dilute isopropanol in water were formulated and tested according to the procedure above, in which each set tested a different concentration of isopropanol. Each set contained 6 tested samples. The mean column height from each set was fit to the column height/surface tension equation to determine the mean surface tension of each set. The mean surface tension of each set was then plotted against the concentration of isopropanol of samples within each set, to generate a curve that can be overlaid with the curve generated from the literature data. The overlaid curves shown in FIG. 2 indicate that the surface tension curve generated by the capillary tube test method described herein is in strong agreement with the surface tension curve generated by Vasquez, et al. As a result, the capillary tube test method can be utilized to determine the surface tension of any of the aqueous compositions described herein.

The capillary tube test method was utilized to evaluate the surface tension of the compositions prepared in Example 2. A standard curve correlating the column height of the liquid inside the capillary tube as a function of surface tension was generated, using deionized water and 100% (w/w) ethanol as the standards. Six samples were included in each set, and the temperature of the room was approximately 22° C. Using the capillary tube test method, it was determined that the surface tension of the first aqueous composition of Example 2 was 25 dyne/cm, and the surface tension of the second aqueous composition was 43 dyne/cm. Surprisingly, the 25 dyne/cm surface tension of the first aqueous composition is approximately equivalent to the surface tension of a composition containing 80% (w/w) ethanol, even though the total alcohol concentration within the first aqueous composition is about 3.2% (w/w). It is expected that the difference in the surface tension of the compositions, if measured at 20° C., would be insubstantial, based on the data disclosed in Vasquez, et al. Accordingly, the first aqueous composition of Example 2, containing both an alcohol blend and a natural biocidal blend, was shown to have both a flash point above 50° C. and a surface tension below 30 dyne/cm, in agreement with the modeling in Example 3, above.

Example 5: Multidimensional Analysis of the Surface Tension and Flash Points of Aqueous Compositions Selected Alcohols A study was conducted in accordance with embodiments of the present disclosure to predict the surface tension and flash point of aqueous compositions containing one or more alcohol compounds, at various concentrations of each alcohol compound. The known physical properties of several alcohols were compiled into JMP, a statistical analysis software available from SAS Institute, Inc, which is able to analyze, model, and visualize data over several variables in order to determine correlations between variables over several dimensions. JMP was utilized to model the effect of the identity and concentration of an alcohol compound, either within a blend or on its own, on the surface tension or flash point of an aqueous composition.

Alcohol compounds that were studied in JMP were: methanol, ethanol, n-propanol, isopropanol, n-butanol, 2-butanol, isobutanol, t-butanol, n-pentanol, 2-pentanol, 3-pentanol, 1-hexanol, 2-hexanol, 3-hexanol, 2-methylbutano-1-ol, 3-methylbutan-1-ol, 2-methylbutan-2-ol, and 3-methylbutan-2-ol. Acetic acid and hydrogen peroxide were also included in the JMP model. Physical properties of each compound that were compiled into JMP include: molecular weight; number of primary carbon atoms, number of secondary carbon atoms, number of tertiary carbon atoms, effective number of carbon atoms, total number of carbon atoms, position of the alcohol group, boiling point, density, flash point, surface tension, and aqueous solubility. Physical properties that were statistically correlated by JMP with a change in surface tension or flash point can then be utilized to predict the surface tension or flash points of aqueous compositions having one or more alcohol compounds at user-defined concentrations.

Statistically correlated variables in the determination of surface tension of a composition were: water concentration, concentration of alcohols by type (primary, secondary, or tertiary); and the concentration of acetic acid in the acetic acid-containing composition. Statistically correlated variables in the determination of flash point were water concentration and concentration of alcohols by type.

The concentrations of alcohol compounds within the first aqueous composition of Example 2 were studied to determine what concentration limits could still result in a flash point greater than about 50° C., +/−0.5°. Generally, the concentration of n-butanol, contained within the natural biocidal blend, was maintained at a constant 0.2% (w/w). Additionally, the concentration of the isopropanol within the composition was maintained at approximately 5% of the total ethanol concentration, based on the 95:5 blend of ethanol to isopropanol used as an ethanol stock solution. JMP modeling indicated that ethanol and isopropanol concentrations within the first aqueous composition can be increased to 3.2% (w/w) and 0.16% (w/w), respectively, while maintaining a constant n-pentanol concentration of 0.9% (w/w), to yield a predicted flash point of about 49.8° C. The predicted surface tension of the composition having 3.2% (w/w) ethanol, 0.16% (w/w) isopropanol, 0.2% (w/w) n-butanol and 0.9% (w/w) n-pentanol (total alcohol concentration of about 4.5% (w/w) was 24.5 dyne/cm.

Similarly, the concentration of the n-pentanol can be increased to 1.6% (w/w), while maintaining a constant ethanol and isopropanol concentrations of 1.9% (w/w) and 0.1% (w/w), respectively, to yield a predicted flash point of about 49.5° C. The predicted surface tension of the composition having 1.9% (w/w) ethanol, 0.1% (w/w) isopropanol, 0.2% (w/w) n-butanol and 1.6% (w/w) n-pentanol was 21.7 dyne/cm.

Example 6: Antimicrobial Efficacy of Peracids Formed In Situ Against *Staphylococcus aureus, Pseudomonas Aeruginosa*, and *Candida auris*

A study was conducted in accordance with embodiments of the present disclosure to determine the antimicrobial kill of peracids formed within reaction layers in situ against selected microorganisms *Staphylococcus aureus, Pseudomonas aeruginosa*, and *Candida auris*, which are known to cause hospital acquired infections. Antimicrobial efficacy against *Staphylococcus aureus* (ATCC #6538) and *Pseudomonas aeruginosa* (ATCC #15442) were determined using the Association of Official Agricultural Chemists Germicidal Spray Method (AOAC 961.02). Test substance exposure consisted of three sprays of the first aqueous composition of Example 2 from a first hand-sprayer, followed by three sprays of the second aqueous composition of Example 2 from a second hand-sprayer. Following exposure, the carriers were transferred to vessels containing neutralizing subculture medium comprising Letheen Broth, 0.28% (w/w) lecithin, 2.0% (w/w) Tween 80, 0.2% (w/w) sodium thiosulfate, and 0.05% (w/w) catalase. The subcultures were incubated at 20° C. for 48 hours and assayed for survivors. Appropriate culture purity, viability, organic soil load sterility, neutralizing subculture medium sterility, carrier sterility, carrier population and neutralization confirmation controls were performed in parallel.

Glass carriers inoculated with *Staphylococcus aureus* (ATCC #6538) were exposed to the reaction layer formed by the first and second aqueous compositions for 9.5 minutes prior to transferring the carriers to subculture medium. 120 glass carriers were inoculated-60 that were supplemented with FBS and 60 that were not supplemented with FBS. The average number of colony forming units (CFU) per carrier ranged from $3.87\times10^5$ to $6.5\times10^5$ ($Log_{10}$=5.59 to 5.81). All 60 of the carriers without FBS present, as well as 59 of the 60 carriers containing FBS, demonstrated no growth of bacteria in the subculture medium, indicating over a log-5 kill of the *Staphylococcus aureus* in 119 of the 120 carriers upon contact with the peracid-containing reaction layer for 9.5 minutes.

Sets of 60 glass carriers inoculated with *Pseudomonas aeruginosa* (ATCC #15442) were exposed to the reaction layer formed by the first and second aqueous compositions for multiple time points—30 seconds, 45 seconds, 60 seconds, 4 minutes, and 9.5 minutes—prior to transferring the carriers to subculture media. All 300 of the glass carriers were supplemented with FBS. The average number of CFU per carrier ranged from $1.7\times10^5$ to $8.2\times10^6$ ($Log_{10}$=5.23 to 6.50). All of the carriers (180 total) that were exposed to the peracid-containing reaction layer for 60 seconds, 4 minutes, or 9.5 minutes demonstrated no growth of bacteria in the subculture medium, indicating over a log-5 kill, and in some instances over a log-6 kill, of the *Pseudomonas aeruginosa* in those carriers after being exposed for at least 60 seconds. 57 of the 60 carriers that were exposed to the peracid-containing reaction layer for 45 seconds demonstrated no growth of bacteria in the subculture medium, and 56 of the 60 carriers that were exposed to the peracid-containing reaction layer for 30 seconds demonstrated no growth of bacteria in the subculture medium, indicating over a log-5 kill, and in some instances over a log-6 kill, of the *Pseudomonas aeruginosa* in those carriers.

Antimicrobial efficacy against *Candida auris* (CDC #AR-0381) was determined using the Organization for Economic Co-Operation and Development (OECD) Quantitative Method for Evaluating Efficacy of Liquid Antimicrobials. The procedure for testing is similar to the procedures described above for determining the efficacy against *Staphylococcus aureus* and *Pseudomonas aeruginosa*, in which: glass carriers inoculated with *Candida auris* and supplemented with 5% (w/w) FBS are exposed to a peracid-containing reaction layer formed from combining the first aqueous composition and the second aqueous composition from Example 2 on the carrier surface; and transferring those carriers to subcultures to evaluate the growth of CFU's within the subculture medium. 25 μL of each aqueous composition was separately dispensed onto the carrier surface and allowed to mix to form the reaction layer on the carrier. The subculture medium for evaluating growth of *Candida auris* is identical to the subculture medium described above. The average number of CFU per carrier was $3.02\times10^5$ ($Log_{10}$=5.48), and each carrier was exposed to the peracid-containing reaction layer for 9.5 minutes. 59 of the 60 carriers demonstrated no growth of bacteria in the subculture medium, indicating over a log-5 kill on those carriers within 9.5 minutes.

We claim:

1. A disinfectant system, the disinfectant system comprising a first aqueous composition and a second aqueous composition, the first aqueous composition comprising a first peracid reactant compound that is either a peroxide compound or an organic acid compound, and the second aqueous composition comprising a second peracid reactant compound that is the other of the first peracid reactant compound, wherein:

(a) the first aqueous composition and the second aqueous composition each comprise a first alcohol, the first alcohol selected from the group of lower-chain alcohols consisting of ethanol, isopropanol, t-butanol, and combinations thereof;

(b) at least one of the first aqueous composition and the second aqueous composition comprises an alcohol blend, the alcohol blend comprising the first alcohol and a second alcohol, wherein:

(i) the second alcohol comprises at least one $C_5$-$C_8$ aliphatic, $C_5$-$C_8$ alicyclic, or $C_5$-$C_8$ aromatic alcohol compound;

(ii) the aqueous composition comprising the alcohol blend has a flash point of at least 50° C.;

(iii) the mass ratio of the first alcohol relative to the second alcohol within the aqueous composition comprising the alcohol blend is at least 1:10, and up to 4:1;

(iv) the second alcohol comprises up to 2.5% by weight of the aqueous composition comprising the alcohol blend;

(v) the alcohol blend comprises at least 2.0% by weight, and up to 4.5% by weight, of the aqueous composition comprising the alcohol blend; and (vi) the surface tension of the aqueous composition comprising the alcohol blend is less than 30 dyne/cm at 20° C.;

(c) the other of the first aqueous composition and the second aqueous composition that does not contain the alcohol blend comprises at least 0.05% by weight, and up to 5% by weight, of the first alcohol;

(d) at least 99.5% by weight of each composition is comprised of components having a vapor pressure of at least 1.0 mm Hg at 20° C.; and (e) when the first aqueous composition and the second aqueous composition are applied separately to, and combined upon, a surface in need of disinfecting, a peracid composition is formed in situ, thereby disinfecting the surface.

2. The disinfectant system according to claim 1, wherein each of the at least one alcohol of the $C_5$-$C_8$ aliphatic $C_5$-$C_8$, alcohol alicyclic $C_5$-$C_8$, or aromatic alcohol compounds, in their neat form, has:

a Log P in a range from at least 1.20, and up to at least 2.0;

a water solubility of at least 10 grams per liter, and up to 30 grams per liter, measured at 25° C.; and a flash point of at least 40° C.

3. The disinfectant system according to claim 2, wherein each $C_5$-$C_8$ aliphatic alcohol, $C_5$-$C_8$ alicyclic alcohol, or $C_5$-$C_8$ aromatic alcohol compound is selected from the group consisting of n-pentanol; 2-methyl-1-butanol; 3,3-dimethyl-2-butanol; 4-methyl-2-pentanol; 2-methyl-3-pentanol; 3-methyl-2-pentanol; 2-hexanol; 3-hexanol; phenol; 4-methyl phenol; phenylethyl alcohol; and 1-phenylethanol.

4. The disinfectant system according to claim 1, wherein the first aqueous composition comprises the alcohol blend, and the surface tension of the second aqueous composition is less than 50 dyne/cm at 20° C.

5. The disinfectant system according to claim 1, wherein:

the peroxide compound is hydrogen peroxide, the hydrogen peroxide comprising up to 25% by weight of the aqueous composition; and the organic acid compound is acetic acid, the acetic acid comprising up to 50% by weight of the aqueous composition, the aqueous composition having a pH less than 7.0.

6. The disinfectant system according to claim 5, wherein the first aqueous composition comprises:

at least 0.5% by weight, and up to 10% by weight, of acetic acid;

at least 1.0% by weight, and up to 3.5% by weight, of ethanol;

at least 0.5% by weight, and up to 1.5% by weight, of at least one alcohol compound selected from the group consisting of 2-hexanol and 3-hexanol; and wherein the second aqueous composition comprises:

at least 0.5% by weight, and up to 10% by weight, of hydrogen peroxide; and up to 4.5% by weight of isopropanol.

7. The disinfectant system according to claim 6, wherein the first aqueous composition further comprises isopropanol and n-butanol, wherein:

isopropanol comprises at least 0.1% by weight, and up to 0.5% by weight of the first aqueous composition; and n-butanol comprises at least 0.1% by weight, and up to 0.5% by weight of the first aqueous composition.

8. The disinfectant system according to claim 5, wherein the first aqueous composition comprises:

at least 0.5% by weight, and up to 10% by weight, of acetic acid;

at least 1.0% by weight, and up to 3.5% by weight, of ethanol;

at least 0.5% by weight, and up to 2.0% by weight, of n-pentanol; and wherein the second aqueous composition comprises:

at least 0.5% by weight, and up to 10% by weight, of hydrogen peroxide; and up to 4.5% by weight of isopropanol.

9. The disinfectant system according to claim 1, wherein the first aqueous composition further comprises a natural biocidal blend, the natural biocidal blend comprising at least 0.001% by weight, and up to 0.5% by weight, of the first aqueous composition, wherein the natural biocidal blend comprises one or more natural biocides or natural biocidal compounds selected from the group consisting of manuka honey, oregano oil, thyme oil, lemongrass oil, lemon oil, orange oil, anise oil, clove oil, aniseed oil, cinnamon oil, geranium oil, rose oil, mint oil, peppermint oil, lavender oil, citronella oil, eucalyptus oil, sandalwood oil, cedar oil, rosmarin oil, pine oil, vervain fleagrass oil, ratanhiae oil, methylglyoxal, carvacrol, eugenol, linalool, thymol, p-cymene, myrcene, borneol, camphor, caryophillin, cinnamaldehyde, geraniol, nerol, citronellol, and menthol, including combinations thereof.

10. The disinfectant system according to claim 1, wherein the disinfectant system is configured to prevent contact between the first aqueous composition and second aqueous composition until both aqueous compositions have been dispersed into a volumetric space that contains the surface to be disinfected.

11. The disinfectant system according to claim 1, wherein the disinfectant system is configured to prevent contact between the first aqueous composition and the second aqueous composition until both aqueous compositions have contacted the surface to be disinfected.

12. The disinfectant system according to claim 1, wherein both the first aqueous composition and the second aqueous composition are substantially free of surfactants, bleaches, polymers, chelators, metal colloids, and nanoparticles.

13. A disinfectant system comprising:

(A) a first aqueous composition having a flash point of at least 50° C. and a surface tension less than 30 dyne/cm at 20° C., the first aqueous composition comprising:

(1) a first peracid reactant compound that is either a peroxide compound or an organic acid compound, and (2) 2.0% to 4.5% by weight of an alcohol blend based on the total weight of the first aqueous composition, the alcohol blend comprising:

(i) a first alcohol selected from the group of lower-chain alcohols consisting of ethanol, isopropanol, t-butanol, and combinations thereof, and (ii) up to 2.5% by weight of a second alcohol based on the total weight of the first aqueous composition, the second alcohol comprising at least one $C_5$-$C_8$ aliphatic alcohol, $C_5$-$C_8$ alicyclic alcohol, or $C_5$-$C_8$ aromatic alcohol;

wherein the mass ratio of the first alcohol to the second alcohol within the first aqueous composition is from 1:10 to 4:1; and (B) a second aqueous composition comprising:

(1) a second peracid reactant compound that is the other of the first peracid reactant compound, and (2) 0.05% to 5% by weight of the first alcohol based on the total weight of the second aqueous composition;

wherein at least 99.5% by weight of each of the first aqueous composition and the second aqueous composition is comprised of components having a vapor pressure of at least 1.0 mm Hg at 20° C.; and wherein when the first aqueous composition and the second aqueous composition are applied separately to, and combined upon, a surface in need of disinfecting, a peracid composition is formed in situ, thereby disinfecting the surface.

14. The disinfectant system according to claim 13, wherein the second aqueous composition has a flash point of at least 50° C.

15. The disinfectant system according to claim 13, wherein the second alcohol is selected from the group consisting of n-pentanol; 2-methyl-1-butanol; 3,3-dimethyl-2-butanol; 4-methyl-2-pentanol; 2-methyl-3-pentanol; 3-methyl-2-pentanol; 2-hexanol; 3-hexanol; phenol; 4-methyl phenol; phenylethyl alcohol; and 1-phenylethanol.

16. The disinfectant system according to claim 13, wherein the first aqueous composition comprises the organic acid compound that comprises acetic acid, and the second aqueous composition comprises the peroxide compound that comprises hydrogen peroxide, the hydrogen peroxide comprising up to 25% by weight of the second aqueous composition.

17. The disinfectant system according to claim 16, wherein the first aqueous composition comprises, by weight:

0.5% to 10% acetic acid;

1.0% to 3.5% ethanol; and 0.5% to 1.5% at least one alcohol compound selected from the group consisting of n-pentanol, 2-hexanol and 3-hexanol; and wherein the second aqueous composition comprises:

0.5% to 10% hydrogen peroxide; and up to 4.5% isopropanol.

18. The disinfectant system according to claim 13, wherein the first aqueous composition further comprises by weight 0.001% to 0.5% a natural biocidal blend comprising one or more compounds selected from the group consisting of manuka honey, oregano oil, thyme oil, lemongrass oil, lemon oil, orange oil, anise oil, clove oil, aniseed oil, cinnamon oil, geranium oil, rose oil, mint oil, peppermint oil, lavender oil, citronella oil, eucalyptus oil, sandalwood oil, cedar oil, rosmarin oil, pine oil, vervain fleagrass oil, ratanhiae oil, methylglyoxal, carvacrol, eugenol, linalool, thymol, p-cymene, myrcene, borneol, camphor, caryophillin, cinnamaldehyde, geraniol, nerol, citronellol, and menthol, including combinations thereof.

19. The disinfectant system according to claim 13, wherein the disinfectant system is configured to prevent contact between the first aqueous composition and the second aqueous composition until both aqueous compositions have been dispersed into a volumetric space that contains the surface to be disinfected, and to prevent contact between the first aqueous composition and the second aqueous composition until both aqueous compositions have contacted the surface to be disinfected.

20. The disinfectant system according to claim 13, wherein both the first aqueous composition and the second aqueous composition are substantially free of surfactants, bleaches, polymers, chelators, metal colloids, and nanoparticles.

* * * * *